UNITED STATES PATENT OFFICE.

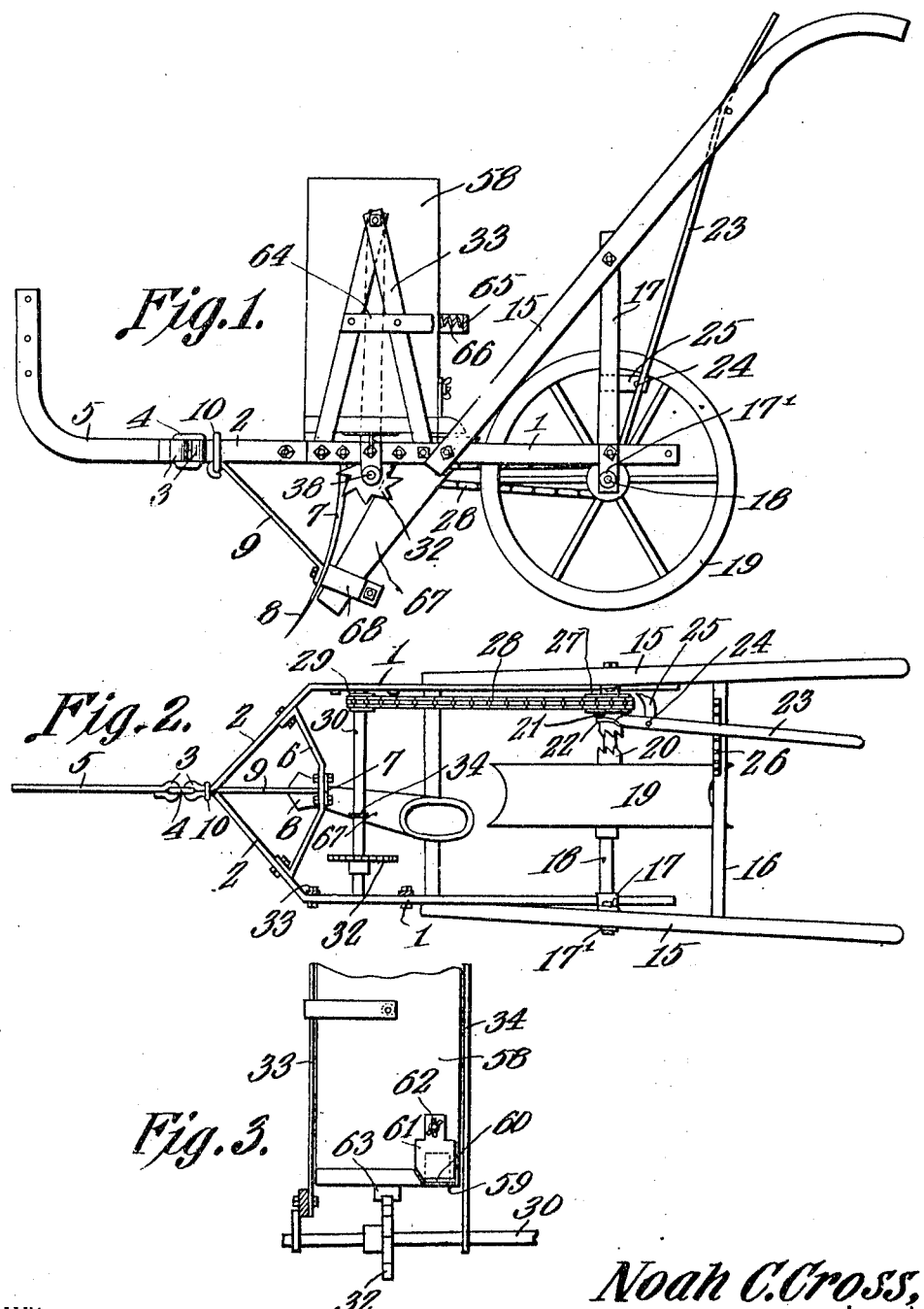

NOAH C. CROSS, OF BUFORD, GEORGIA.

FERTILIZER-DISTRIBUTER.

1,055,321.  Specification of Letters Patent.  Patented Mar. 11, 1913.

Application filed June 29, 1912. Serial No. 706,714.

*To all whom it may concern:*

Be it known that I, NOAH C. CROSS, a citizen of the United States, residing at Buford, in the county of Gwinette and State of Georgia, have invented a new and useful Fertilizer-Distributer, of which the following is a specification.

This invention relates to fertilizer distributers and is more particularly designed for use with a planter such as shown in an application filed by me in the United States Patent Office on March 30, 1912, Serial No. 687,378.

One of the objects of the invention is to provide improved means for directing fertilizer into a discharge spout provided therefor, there being mechanism whereby the fertilizer can be discharged in any desired quantity.

Another object is to provide mechanism of this character which is simple in construction and can be easily operated by one of the supporting wheels of the frame of the fertilizer distributer.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the fertilizer distributer constituting the present invention. Fig. 2 is a plan view thereof, the fertilizer box being removed. Fig. 3 is a rear elevation of the lower portion of the fertilizer box and adjacent parts, one side member of the frame being shown in section.

Referring to the figures by characters of reference 1 designates side frame members the front ends of which converge forwardly as at 2 and form a loop 3 connected, as by means of a link 4, to a standard 5 which is upturned, as shown, and is adapted to be connected to suitable draft appliances. A cross brace 6 is secured between the converging portions 2 of the side members and secured to the center of this brace is the upper end portion of a standard 7 having a furrow opening plow or shovel 8 at its lower end. A brace 9 extends from the lower portion of the standard 7 and upwardly to a ring 10 which extends around the front end portions of the members 2 and close to the loop 3.

Handles 15 extend upwardly and rearwardly from the side member 1 and are connected by a cross bar 16. Braces 17 extend downwardly from the handles and are bolted or otherwise secured to the side members 1 close to the rear ends of said members. Below the braces 17 are located bearings 17' for an axle 18. A ground wheel 19 is loosely mounted on the middle portion of this axle and the tread of this wheel is preferably concaved transversely, as shown particularly in Fig. 2. The hub of the ground wheel 19 has a clutch face 20 and a sleeve 21 constituting a clutch member is feathered on the axle 18 and is engaged by the forked end 22 of a shifting lever 23. This lever is fulcrumed, as at 24, upon a bracket 25 secured upon and extending from the brace 17 at one side of the machine. A notched block 26 is fastened on the cross bar 16 and lever 23 is adapted to be shifted so as to be seated in either of the notches formed in this block. Thus it will be seen that the lever can be secured with the clutch sleeve 21 either in or out of engagement with the clutch face of hub 20.

A sprocket 27 is secured to and rotates with the clutch sleeve 21 and is adapted to transmit motion, through a chain 28, to a sprocket 29 secured to a shaft 30 which is journaled within the front portions of the side members 1 and extends transversely of the machine. A tappet wheel 32 is secured to the shaft 30 close to one side of the machine.

Removably connected to one of the side members 1 of the machine are upwardly converging standards 33 and another standard 34 is mounted loosely on shaft 30, the wheel 32 being located between the standards 33 and 34. The upper ends of the standards are pivotally connected to the upper portions of the sides of a box or casing 58 adapted to hold fertilizer. The bottom of this casing is provided with an outlet spout 59, there being an opening 60 in one wall of the casing and through which material is free to discharge into the spout. This opening is adapted to be partly or entirely closed by means of a gate 61 having a clamping screw 62 by means of which it can be held in any position to which it may be adjusted. An ear 63 extends downwardly from the bottom of the casing 58 and into the path of the teeth of the tappet wheel 32.

Secured to the standards 33 is a side strip 64 having an arm 65 extending at right angles from one end thereof and across the back face of the box 58, there being a spring 66 which connects this arm 65 to the back face of the box 58. This spring serves to hold the box normally with the ear 63 in the path of the teeth of the tappet wheel 32.

The spout 59 discharges into the upper end of a boot 67 which extends downwardly and forwardly so as to discharge fertilizer back of and close to the furrow opener 8. The lower end of the boot 67 is connected to the furrow opener 8 by a bracket 68.

When the machine is moved forward the wheel 19 will, under ordinary conditions, rotate freely on the axle 18. When, however, it is desired to deposit fertilizer in the furrow opened by the plow 8, sleeve 21 is shifted into engagement with hub 20 by means of lever 23. The wheel 19 will thus rotate the sleeve 21 and cause motion to be transmitted through chain 28 and its sprockets to the shaft 30. The tappet wheel 32 will thus strike against ear 63 and cause the box 58 and spout 59 to swing backwardly and forwardly, the jolting action produced by the intermittent striking of the ear 63 being sufficient to cause the fertilizer to flow along the spout 59 and into the boot 67. The fertilizer will thus be directed into the furrow directly back of the plow 8 and the loose soil at the sides of the furrow will fall back onto the fertilizer.

What is claimed is:—

1. In a fertilizer distributer, the combination with a pivoted fertilizer box having an outlet spout extending therefrom, of a boot hung under and designed to receive material from the spout, means for holding the box yieldingly in one position, a revoluble tappet, and means upon the box for engagement by the tappet.

2. A fertilizer distributer including a pivoted fertilizer box having an outlet spout, a boot under the spout, a fixed structure, a spring connection between the box and structure, a revoluble tappet, and means on the box for engagement by the tappet.

3. A fertilizer distributer including standards, a fertilizer box pivotally mounted between the standards, a structure connected to one of the standards, a spring connection between the structure and the box for holding the box normally in a predetermined position, an outlet spout extending from the box, means for controlling the flow of material into the spout, a boot for receiving material from the spout, a tappet mounted for rotation, and an ear depending from the box and normally in the path of the tappet.

4. In a fertilizer distributer, the combination with a wheel supported frame, and a furrow opener fixedly connected to the frame, of a boot extending downwardly from the frame and fixedly connected to the back of the furrow opener, standards upon the frame, a fertilizer box pivotally mounted between the standards, an outlet spout extending therefrom, means for controlling the flow of material from the box and into the spout, a fixed structure connected to one of the standards, a spring connection between said structure and the box for holding said box normally in a predetermined position, means depending from the box, a tappet wheel for engaging said means, a shaft revoluble with the wheel, means for transmitting motion thereto from the supporting wheel.

5. In a fertilizer distributer, the combination with a frame, a furrow opener carried by the front end portion thereof, and a supporting wheel adjacent the rear end of the frame, of a fertilizer box, means for conveying fertilizer from the fertilizer box and into the furrow at a point close to the furrow opener, and means for controlling the discharge of fertilizer from the fertilizer box, said means including a depending spout in the bottom of the box, and discharging into the fertilizer conveying means, a revoluble tappet, means on the box for engagement by the tappet, and means actuated by the supporting wheel for rotating the tappet.

In testimony that I claim the foregoing as my own, I have hereto affixed my signature in the presence of two witnesses.

NOAH C. CROSS.

Witnesses:
W. A. RUPP,
W. O. SHADBURN.